2 Sheets—Sheet 1.

E. A. PECK.

HARVESTER.

No. 7,372.

Reissued Oct. 31, 1876.

Attest

W. S. Baker

L. A. Bunting

Inventor

Ezra A. Peck

By Coburn & Thacher

Attorneys

2 Sheets—Sheet 2.

E. A. PECK.

HARVESTER.

Reissued Oct. 31, 1876.

No. 7,372.

Attest
W. S. Baker
L. A. Bunting

Inventor
Ezra A. Peck
By Coburn & Thacher
Attorneys

THE GRAPHIC CO. N.Y.

UNITED STATES PATENT OFFICE.

EZRA A. PECK, OF SYCAMORE, ILLINOIS.

IMPROVEMENT IN HARVESTERS.

Specification forming part of Letters Patent No. 128,974, dated July 16, 1872; reissue No. 7,372, dated October 31, 1876; application filed May 27, 1876.

*To all whom it may concern:*

Be it known that I, EZRA A. PECK, of the town of Sycamore, in the county of De Kalb and State of Illinois, have invented certain new and useful Improvements in Harvesting-Machines, of which the following is a full description, reference being had to the accompanying drawing, making a part of this specification, in which—

Figure 1:
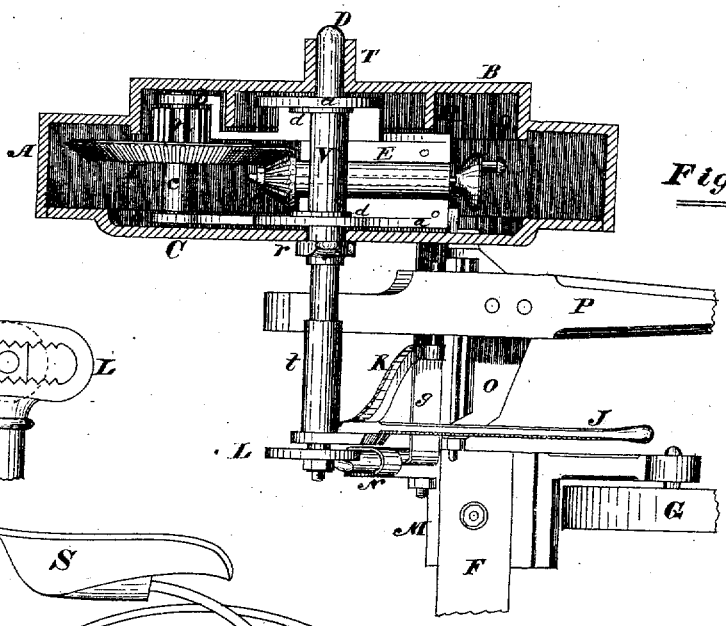
Figure 3:
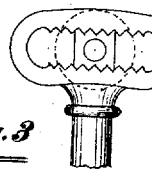
Figure 2:
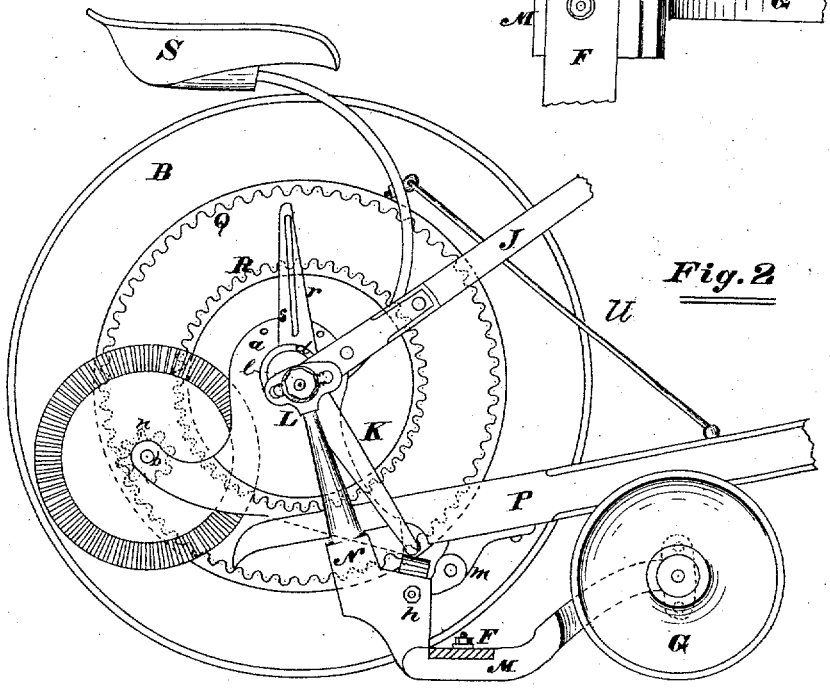
Figure 4:
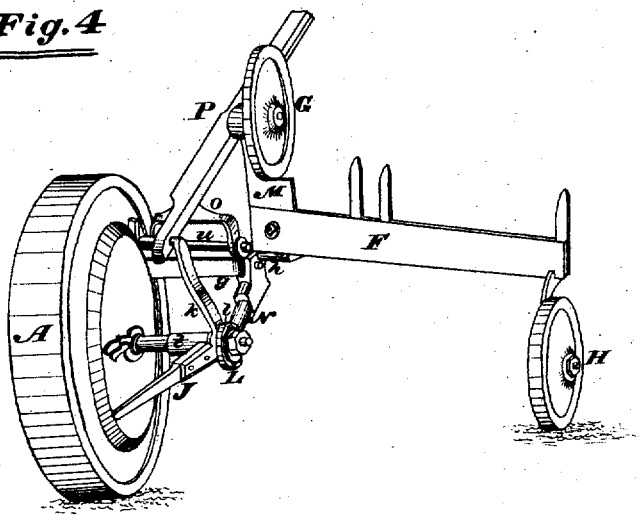
Figure 5:
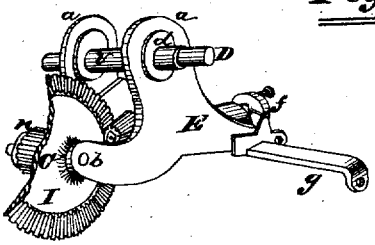

Figure 1 is a plan view, the driving-wheel being represented in section; Fig. 2, a side elevation, looking from the grain side of the machine, with the plate C removed; Fig. 3, a detail view; Fig. 4, a perspective view, showing the position of the machine when ready for transportation from place to place; and Fig. 5, a perspective of the main frame and driving-gear removed from the wheel.

My invention consist in supporting the entire gearing upon a frame hung upon the main axle, and inclosed within the drive-wheel, and also in certain devices and combinations thereof, as will be hereinafter fully set forth.

In the drawings, A represents the tread-band of the driving-wheel, the outside of which wheel is covered by a casing, B, which may be made with and a part of the tread-band A. A hub, T, is also formed upon this casing for the support of the outer end of the axle D, which is fastened to and turns with the wheel, while the other end turns in a bearing in the head L. A plate, C, is supported upon the main axle, and fitted just within the tread-band A, so as to completely cover and protect the inside of the wheel. A gear-frame, E, is hung upon the main axle D, within the drive-wheel. The entire gearing of the machine, except that upon the drive-wheel, is mounted upon this frame E, and the frame is within the tread-band A of the wheel, so that both frame and gearing are entirely inclosed and protected by the casing B and plate C. The frame and gearing are also constructed and arranged as to be nearly balanced upon the main axle, from which they are suspended within the drive-wheel. The gear-frame E has two arms, *a a*, in which are eccentric holes, forming bearings for the eccentric *d d*, which are permanently secured to the collar *v*, through which the axle D passes. To this collar, and upon the outside of C, is secured a lever, *r*, by means of which the collar *v*, and with it the eccentrics *d*, can be rotated upon the axle D, changing the position of the main frame. *s* is a small lever, pivoted to the lever *r*, the lower end of it being bent so as to enter holes or slots provided in the plate C, its object being to hold the lever *r* and collar *v*, with the parts connected therewith, in any desired position; *b b*, two other arms, being part of the main frame, in the ends of which are bearings for the axle *c*, upon which the beveled wheel I with its pinion *n* are secured; *e*, a beveled pinion-wheel attached to a shaft passing through the lower part of the main frame E, upon the outer end of which shaft is the crank-wheel which operates the pitman-rod, which is to be connected to the sickle in the usual manner. *g* is a bar which passes through an opening in the plate C, and is permanently fastened to the main frame. The other end of this bar *g* is pivoted, at *h*, to the inner shoe, from which the standard N extends upward and backward to the main axle. The upper end of the standard N is provided with a slotted head, L, the faces of the slot being serrated, as shown in the drawings. A small piece, *l*, which forms a bearing for the inner end of the axle D, is also provided with teeth, which engage with the teeth in the slot. This bearing *l* may be provided with a permanent washer, (indicated by a dotted line in Fig. 3;) and teeth may be provided in the side of the slotted head instead of on the inside of the slot and bearing *l*, as described above.

By changing the position of the bearing *l* in the slotted head the angle of the sickle-guards with the ground may be somewhat changed.

*t* is a loose collar upon the axle D, to which collar is secured a lever, J K. The arm K of this lever is bent at the outer end, so as to pass under the pole P, which is pivoted to the machine by means of the coupling-iron O and pin or rod *u*, one end of which is screwed into or otherwise secured to the main frame, and the other supported by a bearing in the inner shoe, as shown in Fig. 4; G H, two wheels supporting the ends of the sickle-bar F in the usual manner.

When the machine is to be transported from place to place it can be brought into the position shown in Fig. 4, by the use of the lever J K, as by raising the arm J of the lever the other end will lift the rear end of the pole, the end of the arm K passing gradually along the under side of the pole from the position shown in Figs. 1 and 2 to that represented in Fig. 4, and may be held in that position by a notch near the end of the pole. As the rear end of the pole is elevated by means of this lever J K, the main frame performs a partial revolution backward, thereby carrying the bar *g* upward.

The bar *g* and inner shoe M, to which the finger-bar is attached, vibrate freely about the main axle, and, therefore, when the rear end of the pole is raised, as described above, the finger-bar will be elevated and turned up, as shown in Fig. 4 of the drawings, in which position the outer end of the cutting apparatus is still supported by the wheel H. On the inside of B are two sets of gear, Q R, between which the pinion upon the shaft *c* is located, as represented in Fig. 1. By means of the eccentrics *d d* and lever *r* the position of the main frame and parts attached thereto can be changed, as before stated, bringing the pinion into gear either with the gearing Q or R, as may be desired, thus giving to the sickle either a rapid or a slow motion, as may be desired, for different kinds of work. The pinion *n* is to be thrown entirely out of gear by stopping it between the gear-wheels or gears Q and R, when the machine is to be transported from place to place. The driver's seat *s* is mounted upon a standard, T, which is loosely attached to the main axle of the machine, so as to vibrate thereon. A rod, U, connects the seat-standard and the hinged tongue P, being pivoted or hinged to both of them. By this construction and arrangement of devices whenever the vibrating frame is raised by lifting the rear end of the pole the position of the seat is but slightly changed. The proper balance of the machine is thus maintained, as the position of the seat is not materially affected by the raising and lowering of the finger-bar on rough ground, or by the elevation of the cutting apparatus for transportation.

Having thus described my invention, what I claim as new, and desire to secure by Letters Patent, is—

1. A frame, E, upon which the entire driving-gear of the machine, except the main drive-wheel, is mounted, hinged upon the main axle within the drive-wheel, so that the gear-frame and gearing are suspended from, and vibrates about, the axle within said wheel, substantially as described.

2. The combination of the drive-wheel A B, face-plate C, and gear-frame E, suspended upon the main axle, and inclosed within the tread-band, casing, and face-plate, substantially as described.

3. The combination of a vibrating frame, to which the cutting apparatus is attached, draft-pole hinged thereto, and lever J K bent at its lower end to pass under the pole P, substantially as and for the purpose set forth.

4. The combination of the vibrating frame, hinged draft-pole, lever J K, pivoted seat-standard, and link-rod U, so that when the vibrating frame is raised by the lever acting upon the draft-pole, the seat-standard will also be retained in position to maintain the balance of the machine, substantially as described.

5. The combination of the inclosed gear-frame E, provided with bearings *a a*, eccentric *d d*, pinion *n*, gear Q, and a suitable device for operating the eccentrics, substantially as and for the purpose set forth.

6. The combination of the notched head L on the standard N, and the notched bearing *l*, for the purpose of adjusting the angle of the guard-fingers, substantially as described.

7. The combination of the lever J K, hinged pole P, standard N, finger-bar F, and wheel H, for elevating, turning up, and supporting the cutting apparatus, substantially as described.

EZRA A. PECK.

Witnesses:
C. W. MOSHER,
A. M. STARK.